United States Patent
Fan et al.

(10) Patent No.: US 10,289,254 B2
(45) Date of Patent: May 14, 2019

(54) TOUCH CONTROL VEHICLE SEAT AND VEHICLE-MOUNTED ENTERTAINMENT SYSTEM

(71) Applicants: Tsinghua University, Beijing (CN); HON HAI PRECISION INDUSTRY CO., LTD., New Taipei (TW)

(72) Inventors: Shou-Shan Fan, Beijing (CN); Liang Liu, Beijing (CN); Li Qian, Beijing (CN); Yu-Quan Wang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 157 days.

(21) Appl. No.: 15/359,867

(22) Filed: Nov. 23, 2016

(65) Prior Publication Data

US 2017/0147108 A1 May 25, 2017

(30) Foreign Application Priority Data

Nov. 24, 2015 (CN) .................... 2015 2 0945092 U

(51) Int. Cl.
| | |
|---|---|
| *G06F 3/044* | (2006.01) |
| *B60K 35/00* | (2006.01) |
| *G06F 3/041* | (2006.01) |
| *B60K 37/06* | (2006.01) |
| *B60N 2/75* | (2018.01) |

(52) U.S. Cl.
CPC ............. *G06F 3/044* (2013.01); *B60K 35/00* (2013.01); *B60K 37/06* (2013.01); *B60N 2/79* (2018.02); *G06F 3/041* (2013.01); *G06F 3/0416* (2013.01); *B60K 2350/1024* (2013.01); *B60K 2350/1028* (2013.01); *B60K 2350/2086* (2013.01); *B60K 2350/921* (2013.01); *G06F 2203/04102* (2013.01); *Y10S 977/742* (2013.01)

(58) Field of Classification Search
CPC .... B60K 2350/1024; B60K 2350/1028; B60K 2350/2086; B60K 2350/921; B60K 35/00; B60K 37/06; B60N 2/79; G06F 2203/04102; G06F 3/041; G06F 3/0416; G06F 3/044; Y10S 977/742
See application file for complete search history.

(56) References Cited

U.S. PATENT DOCUMENTS

| | | | |
|---|---|---|---|
| 2005/0140157 A1* | 6/2005 | Ennerling | B29C 45/1635 296/24.34 |
| 2007/0057781 A1* | 3/2007 | Breed | B60K 35/00 340/457.1 |
| 2009/0195659 A1* | 8/2009 | Nagata | G06F 3/03547 348/207.1 |

(Continued)

*Primary Examiner* — Viet D Pham
(74) *Attorney, Agent, or Firm* — ScienBiziP, P.C.

(57) ABSTRACT

A vehicle seat with touch control function includes a seat armrest, the seat armrest includes an armrest frame, a flexible pad, a flexible touch panel, and a protective cover. The flexible touch panel is elastic, and the flexible touch panel includes a flexible substrate and a carbon nanotube touch function layer to collect touch input from a user. Such flexible touch panel may be installed on or in armrest of any seat in vehicle, enabling control of a display while comfortably seated, having to lean forward is avoided. A vehicle-mounted entertainment system incorporating such touch control system is also provided.

20 Claims, 5 Drawing Sheets

(56) References Cited

U.S. PATENT DOCUMENTS

| | | | | |
|---|---|---|---|---|
| 2010/0001971 A1* | 1/2010 | Jiang | ............ | B82Y 10/00 |
| | | | | 345/173 |
| 2010/0317409 A1* | 12/2010 | Jiang | ............ | G06F 1/1626 |
| | | | | 455/566 |
| 2012/0069486 A1* | 3/2012 | Lee | ............ | G01D 5/2405 |
| | | | | 361/301.1 |
| 2013/0135831 A1* | 5/2013 | Hsu | ............ | B29C 45/14467 |
| | | | | 361/752 |
| 2015/0234427 A1* | 8/2015 | Schmidt | ............ | G06F 1/1632 |
| | | | | 361/679.43 |
| 2015/0261355 A1* | 9/2015 | Wu | ............ | G06F 3/044 |
| | | | | 345/173 |
| 2015/0370329 A1* | 12/2015 | Koyama | ............ | G06F 3/016 |
| | | | | 345/173 |
| 2017/0031496 A1* | 2/2017 | Joo | ............ | G06F 3/04883 |

* cited by examiner

TOUCH CONTROL VEHICLE SEAT AND VEHICLE-MOUNTED ENTERTAINMENT SYSTEM

CROSS-REFERENCE TO RELATED APPLICATIONS

This application claims all benefits accruing under 35 U.S.C. § 119 from China Patent Application No. 201520945092.0, filed on Nov. 24, 2015, in the China Intellectual Property Office, the contents of which are hereby incorporated by reference.

FIELD

The present disclosure relates to touch control vehicle seat and vehicle-mounted entertainment system.

BACKGROUND

Vehicle-mounted entertainment systems typically include a display screen for displaying pictures. A passenger can achieve interactive control by touching the surface of the display screen. The display screen is usually located in an under side of a control panel in the front of a car, or a back side of a front seat.

However, in a large car, passengers are farther away from the display screen, passengers need to lean forward to touch the display screen. For playing games in particular, leaning forwards to touch the screen is not convenient.

BRIEF DESCRIPTION OF THE DRAWINGS

Implementations of the present technology will now be described, by way of example only, with reference to the attached figures, wherein.

DETAILED DESCRIPTION

Figure 1:
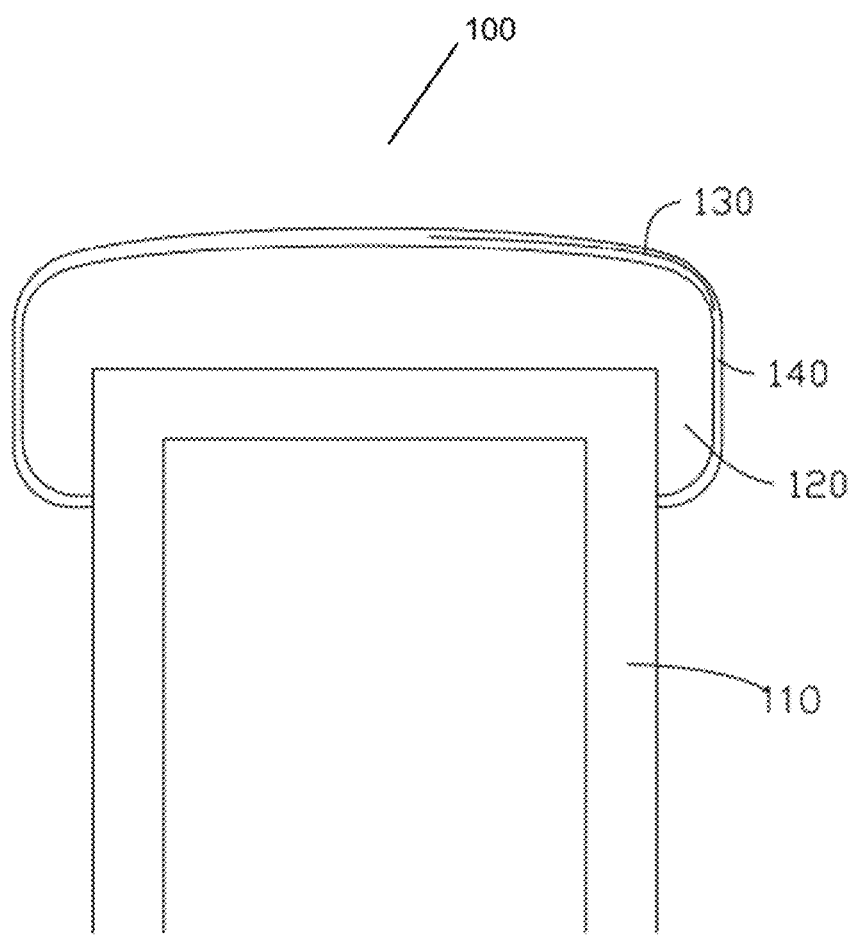
FIG. 1 is a sectional schematic view of an embodiment of a car seat armrest.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
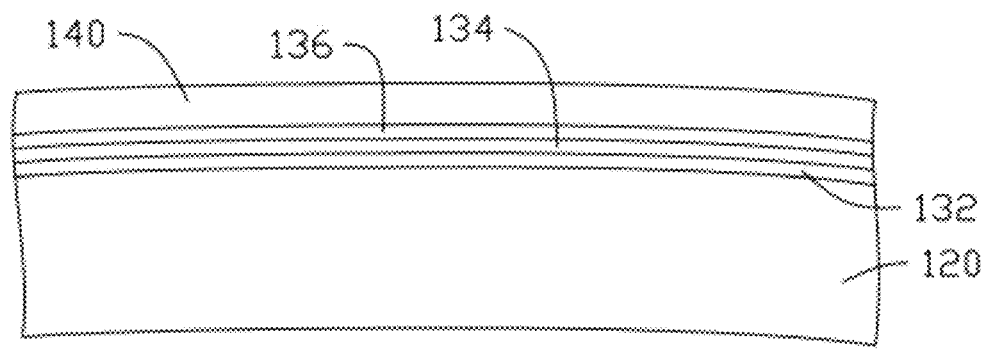
FIG. 2 is a schematic view of part of an embodiment of a car seat armrest.
Figure 3:
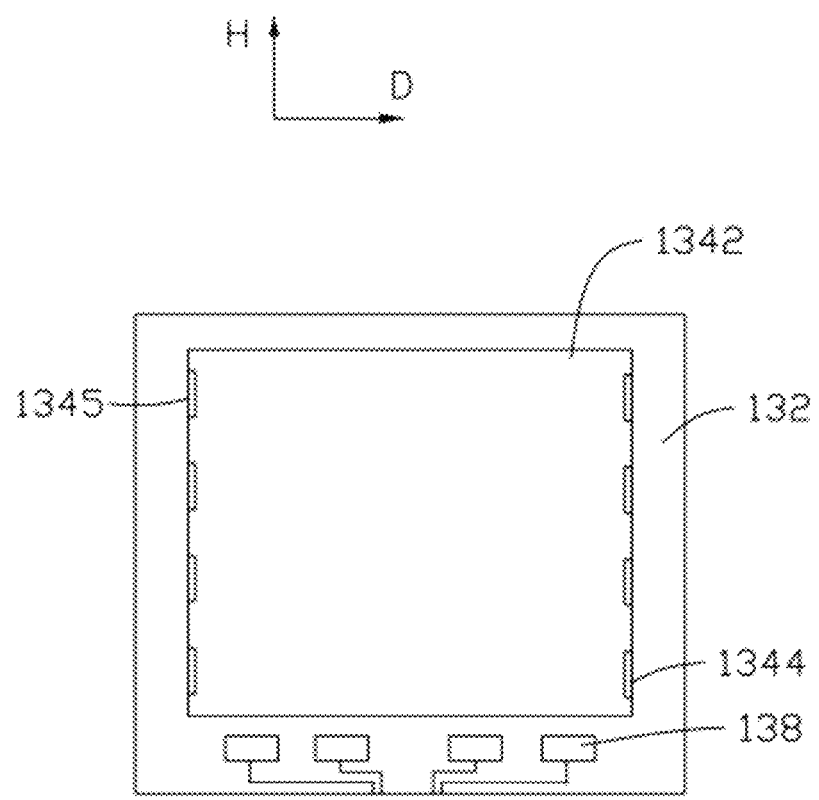
FIG. 3 is an overview of an embodiment of a carbon nanotube touch function layer utilized in the car seat armrest of FIG. 1.

Referring to FIG. 1 to FIG. 3, the present disclosure is described in relation to a touch control vehicle seat comprising a seat armrest 100. The seat armrest 100 comprises an armrest frame 110, a flexible pad 120, a flexible touch panel 130, and a protective cover 140. The flexible pad 120 is located on an upper side of the armrest frame 110. The flexible touch panel 130 is located on the flexible pad 120. The protective cover 140 is wrapped about the flexible touch panel 130. The flexible touch panel 130 is located between the protective cover 140 and the flexible pad 120.

The flexible touch panel 130 is an elastic structure. The flexible touch panel 130 comprises a flexible substrate 132 and a carbon nanotube touch function layer 134. The carbon nanotube touch function layer 134 comprises a carbon nanotube film 1342, a plurality of first electrodes 1344, and a plurality of second electrodes 1345. The carbon nanotube film 1342 is located on a surface of the flexible substrate 132. Both the plurality of first electrodes 1344 and the plurality of second electrodes 1345 are electrically connected to the carbon nanotube film 1342. The carbon nanotube touch function layer 134 is a single layer structure. The positions of touches occurring on a surface of the protective cover 140 can be sensed by the carbon nanotube touch function layer 134.

The armrest frame 110 is a rigid structure; and the armrest frame 110 has the same shape as the seat armrest 100. The armrest frame 110 is used to support the flexible pad 120. An upper side of the armrest frame 110 is where the passengers or users generally place their arms.

The flexible pad 120 is an elastic structure, which can provide a cushion for user's arms. The flexible pad 120 has a certain thickness. A material of the flexible pad 120 can be sponge, fabric, cotton, plastic foam, or the like. The flexible pad 120 may deform while being pressed by the user's arms, and restores to its original shape after a pressure disappears.

In one embodiment, the flexible touch panel 130 is located on a portion of the flexible pad 120. Palms of users can be placed at one end of the flexible pad 120 furthest away from a seat back of the seat armrest 100. In one embodiment, the flexible touch panel 130 is located at one end of the flexible pad 120 away from the seat back. When the users place their arms on the seat armrest 100, the palms of the users are located substantially above the flexible touch panel 130. In one embodiment, the flexible touch panel 130 is conveniently located below the fingers of the users seated in the touch control vehicle seat.

The protective cover 140 is located outside of the flexible touch panel 130. In one embodiment, the protective cover 140 is wrapped about the flexible touch panel 130 and the flexible pad 120. In one embodiment, the protective cover 140 cocoons the flexible touch panel 130, the flexible pad 120, and the armrest frame 110. A material of the protective cover 140 can be selected from animal leather, artificial leather, or fabric. The protective cover 140 has a smaller thickness. In one embodiment, a thickness of the protective cover 140 is in a range from about 1 micron to about 5 millimeters.

An outer surface of the protective cover 140 can be printed with a pattern that indicates a position of the carbon nanotube touch function layer 134 of the flexible touch panel 130. In one embodiment, the flexible touch panel 130 further includes a keyboard 138, and the outer surface of the protective cover 140 is printed with a pattern that indicates a position of the keyboard 138.

The flexible touch panel 130 is an elastic structure. The flexible touch panel 130 comprises a flexible substrate 132 and a carbon nanotube touch function layer 134. The flexible substrate 132 is an elastic sheet structure. An elastic deformation of the flexible substrate 132 when pressed is substantially equal to that of the flexible pad 120. The flexible substrate 132 may have greater deformation when pressed by the user's arms, and will restore to its original shape after the pressure disappears. A thickness of the flexible substrate 132 can be in a range from about 1 micron to about 2 millimeters. The carbon nanotube touch function layer 134 is fixed on a surface of the flexible substrate 132. The carbon nanotube film 1342 can adhere to the surface of the flexible substrate 132 by its own Van der Waals force. The carbon nanotube film 1342 can also be fixed to the surface of the flexible substrate 132 by an adhesive. In one embodiment, the plurality of first electrodes 1344 is a conductive layer formed by printing a conductive paste on a surface of the carbon nanotube film 1342. A material of the plurality of first electrodes 1344 can be metal having good electrical conductivity, such as silver, gold, or copper. The carbon nanotube film 1342 comprises a first surface and a second surface opposite to the first surface. The first surface can be bonded to the flexible substrate 132 and the second surface can be directly bonded to the protective cover 140.

In one embodiment, the flexible touch panel 130 further includes a flexible protective layer 136. The flexible protective layer 136 is located on the second surface of the carbon nanotube film 1342. The carbon nanotube film 1342 is located between the flexible protective layer 136 and the flexible substrate 132. The flexible protective layer 136 is an elastic sheet structure. A laminated structure can be formed by the flexible protective layer 136, the carbon nanotube film 1342, and the flexible substrate 132. The laminated structure may have an elastic deformation while being pressed by the user's arms, and will restore to its original shape after the pressure disappears. The flexible protective layer 136 has a smaller thickness. In one embodiment, a thickness of the flexible protective layer 136 is in a range from about 0.5 micron to about 1 millimeter. Both a material of the flexible substrate 132 and a material of the flexible protective layer 136 can be organic polymer. The organic polymer can comprise cellulose triacetate (TAC), polystyrene, polyethylene, polycarbonate (PC), poly (methyl methacrylate) (PMMA), Polyethylene terephthalate (PET), benzocyclobutene (BCB), polycycloolefin, and the like.

The carbon nanotube film 1342 comprises a plurality of carbon nanotubes. The plurality of the carbon nanotubes in the carbon nanotube film 1342 are arranged substantially along a same direction. Thus, a conductivity of the carbon nanotube film 1342 along an extension direction of the plurality of the carbon nanotubes is far greater than a conductivity other directions. An end of one carbon nanotube is joined to an end of an adjacent carbon nanotube arranged substantially along the same direction by Van der Waals force, to form a free-standing film. The carbon nanotube film 1342 is formed by laminating the plurality of carbon nanotubes by Van der Waals forces, and the plurality of carbon nanotubes has excellent bend resistance and toughness; thus, the carbon nanotube film 1342 can be arbitrarily bent along with the flexible substrate 132 without being damaged. The flexible touch panel 130 will continue to work after many repeated bending cycles.

The carbon nanotube film 1342 can be a drawn carbon nanotube film formed by drawing from a carbon nanotube array. The plurality of carbon nanotubes are arranged substantially parallel to a surface of the drawn carbon nanotube film, and arranged substantially along the same direction. When the carbon nanotube film 1342 is bonded to the flexible substrate 132, the plurality of carbon nanotubes are arranged substantially parallel to a surface of the flexible substrate 132.

An upper surface of the flexible pad 120 can be molded or made for user comfort. Such as a position where the users place palms on the seat armrest 100 can be a streamline structure of a curved surface. When the flexible touch panel 130 is bonded to the curved surface, the flexible touch panel 130 can be naturally curved before external pressure is applied.

Figure 4:
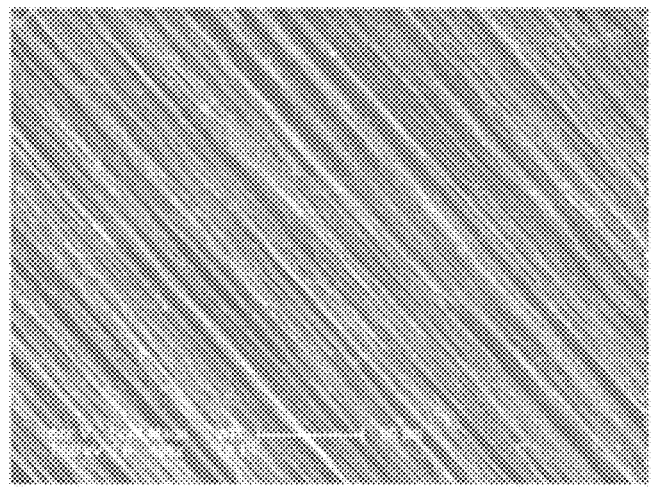
FIG. 4 is a scanning electron microscope (SEM) photo of an embodiment of a carbon nanotube film.

Referring to FIG. 4, the carbon nanotube film 1342 comprises a plurality of carbon nanotubes. A large number of the plurality of carbon nanotubes in the carbon nanotube film 1342 can be oriented along a preferred direction, meaning that a large number of the plurality of carbon nanotubes in the carbon nanotube film 1342 are arranged substantially along the same direction. The plurality of carbon nanotubes that are arranged substantially parallel to a surface of the carbon nanotube film 1342. A large number of the plurality of carbon nanotubes in the carbon nanotube film 1342 are combined together by Van der Waals force. An end of one carbon nanotube is joined to an end of an adjacent carbon nanotube arranged substantially along the same direction by Van der Waals force, to form a free-standing film. The term 'free-standing' includes films that do not have to be supported by a substrate. A minority of the plurality of carbon nanotubes in the carbon nanotube film 1342 may be randomly aligned. However, the number of randomly aligned carbon nanotubes is very small and does not affect the overall oriented alignment of the majority of the plurality of carbon nanotubes in the carbon nanotube film 1342. The majority of the plurality of carbon nanotubes in the carbon nanotube film 1342 are substantially aligned along the same direction and may not be exactly straight. They may be curved to a certain degree, or are not exactly aligned along the overall aligned direction, and can deviate from the overall aligned direction by a certain degree. Therefore, partial contact can exist between the randomly aligned carbon nanotubes and adjacent carbon nanotubes. A width of the drawn carbon nanotube film is dependent upon the carbon nanotube array from which the drawn carbon nanotube film is drawn. A thickness of the carbon nanotube drawn film can range from about 0.5 nanometers to about 100 micrometers.

A method for fabricating the carbon nanotube film 1342 by drawing from a carbon nanotube array comprises the steps of: (a) selecting a plurality of carbon nanotube segments having a predetermined width from the carbon nanotube array, by using a tool (e.g., adhesive tape or another tool allowing multiple carbon nanotubes to be gripped and pulled simultaneously); and (b) pulling the carbon nanotube segments at an even/uniform speed to form the carbon nanotube film 1342.

Examples of the method for fabricating the carbon nanotube film 1342 are taught for instance by U.S. Pat. No. 8,048,256 to Feng et al.

In step (a), quite usefully, the carbon nanotube segments having a predetermined width can be selected by using a wide adhesive tape as the tool to contact the carbon nanotube array. In step (b), the pulling direction is, usefully, substantially perpendicular to the growing direction of the carbon nanotube array of carbon nanotubes.

More specifically, during the pulling process, as the initial carbon nanotube segments are drawn out, other carbon nanotube segments are also drawn out end to end due to Van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner has a selectable, predetermined, width.

The carbon nanotube film 1342 has a minimum electrical resistance along an extending direction of the carbon nanotubes, and has a maximum electrical resistance in a direction perpendicular to the extending direction. The carbon nanotube film 1342 is an electrically anisotropic film. A first direction is defined as a lowest impedance direction. Conductivity along the first direction is much larger than conductivity along other directions. A second direction is defined as a highest impedance direction. Conductivity along the second direction is much smaller than conductivity along other directions. The first direction is substantially perpendicular to the second direction. The carbon nanotube film 1342 can be rectangular having four sides; wherein two opposite sides are parallel to direction H, and the other two opposite sides are parallel to the first direction. Since the carbon nanotube film 1342 is an electrically anisotropic film, multi-touch can be sensed by the carbon nanotube touch function layer 134. A ratio of the impedance of the second direction to that of the first direction is larger than or equal to 50. In one embodiment, the ratio of the impedance of the second direction to that of the first direction ranges from about 70 to about 500. The carbon nanotube touch function layer 134 can comprise a plurality of carbon nanotube films 1342. A great majority of the carbon nanotubes in a plurality of carbon nanotube films 1342 are arranged along the same direction. The plurality of carbon nanotube films 1342 can be stacked with or on each other. The plurality of carbon nanotube films 1342 can also be coplanar and be in contact with each other. Thus, a length and a width of the flexible touch panel 130 are not limited and can be selected according to need.

The plurality of first electrodes 1344 can be located on a first side of the carbon nanotube film 1342. These are arranged along the second direction. The plurality of first electrodes 1344 are spaced apart from each other. A space between adjacent first electrodes in the plurality of first electrodes 1344 can range from about 1 mm to about 8 mm. A length of each of the plurality of first electrodes 1344 along the second direction can range from about 1 mm to about 8 mm. The plurality of second electrodes 1345 can be located on a second side of the carbon nanotube film 1342. The second side of the carbon nanotube film 1342 is opposite to the first side of the carbon nanotube film 1342. Each of the plurality of second electrodes 1345 are spaced apart from each other. The plurality of first electrodes 1344 and the plurality of second electrodes 1345 are one-to-one along the first direction. A space between each adjacent second electrode in the plurality of second electrodes 1345 can range from about 1 mm to about 8 mm. A length of each second electrode of the plurality of second electrodes 1345 along the second direction can range from about 1 mm to about 8 mm. A signal input to the carbon nanotube film 1342 from the plurality of first electrodes 1344 and the plurality of second electrodes 1345 is mainly transported along the first direction. The carbon nanotube touch function layer 134 can determine a touch point position by a directional signal transmission. A size and a spacing of the plurality of first electrodes 1344 and of the plurality of second electrodes 1345 are not limited and can be selected according to need.

The carbon nanotube touch function layer 134 can further comprise a driving circuit (not shown) electrically connected to the plurality of first electrodes 1344. The driving circuit scans the plurality of first electrodes 1344 and the plurality of second electrodes 1345 step by step to scan for an electrical signal. When the protective cover 140 of the seat armrest 100 is touched, a capacitance is generated between the carbon nanotube film 1342 and the fingertip or other conductive medium. The capacitance is alternately charged and discharged by a charging circuit and a memory circuit of the driving circuit. A capacitance charging, such as voltage value, is recorded, and the touch point position can be determined according to the capacitance charging. In one embodiment, the charging circuit is a voltage source; and the memory circuit is a capacitor.

Since the carbon nanotube film 1342 is an electrically anisotropic film, an electrical current is mainly transported along the first direction. When a certain position on the protective cover 140 corresponding to the carbon nanotube film 1342 is touched, different electrical signals can be detected by the plurality of first electrodes 1344 and the plurality of second electrodes 1345 at different locations. The closer a touch point may be to the plurality of first electrodes 1344 or the plurality of second electrodes 1345, the larger will be the signal received by the plurality of first electrodes 1344 or the plurality of second electrodes 1345. A coordinate of the touch point along the first direction of the carbon nanotube touch function layer 134 can be determined, according to a first signal value received by the plurality of first electrodes 1344 and a second signal value received by the plurality of second electrodes 1345. A method of determining a touch point coordinate along the second direction of the carbon nanotube touch function layer 134 comprises the following steps: Firstly, a larger signal value from signal values received by adjacent first electrodes 1344 is defined as a third signal value, and a larger signal value from signal values received by adjacent second electrodes 1345 is defined as a fourth signal value. Secondly, interpolating the third signal value and the fourth signal value, or adding the third signal value and the fourth signal value in a proportional relationship. Finally, the touch point coordinates along the second direction can be obtained. The proportional relationship can be determined based on a change in received signal values during a simulation process.

Figure 5:
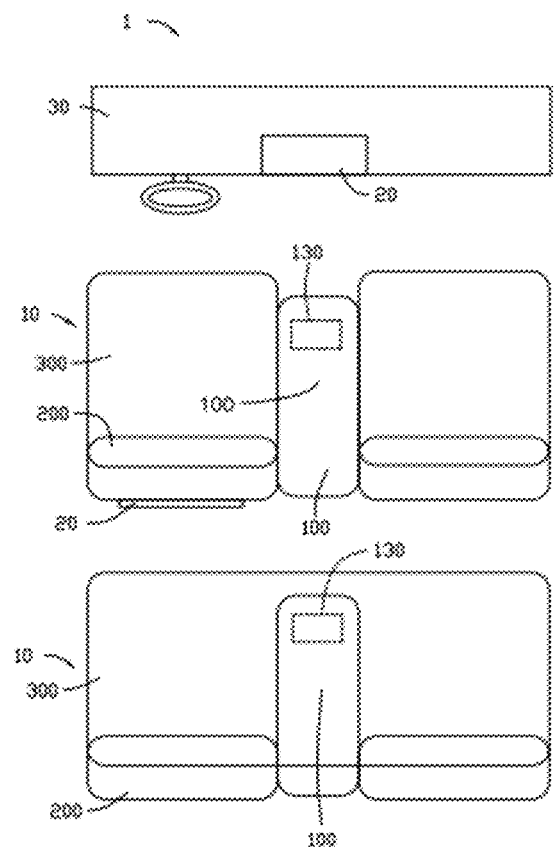
FIG. 5 is an overview of an embodiment of a vehicle-mounted entertainment system.

Referring to FIG. 5, the touch control vehicle seat 10 further comprises a seat back 200 and a seat 300. The present disclosure is described in relation to a vehicle-mounted entertainment system 1 comprising the touch control vehicle seat 10 and a display 20. The display 20 is connected to the touch control vehicle seat 10 and transfers data through a wireless connection or a wired connection. The wireless connection can be WI-FI, infrared, BLUETOOTH or the like connection. The wireless connection can be achieved by a first wireless communication module located in the display screen 20 and a second wireless communication module located in the flexible touch panel 130. The wired connection can connect the display screen 20 to the flexible touch panel 130 via a data line. The data line can be embedded in a floor of a lower portion of the touch control vehicle seat 10 so as not to affect the ride for passengers.

When the touch control vehicle seat 10 is a rear seat of a car, the display 20 can be located in a rear side of the seat back 200 in front row. When the touch control vehicle seat 10 is a front seat of a car, the display 20 can be located on a front centering board 30 of the car. When passengers interactively operate the display 20, passengers need not to lean forward to touch the display screen, the passenger can touch an area where the flexible touch panel 130 is located on the seat armrest 100 while watching the display screen of the display 20. The flexible touch panel 130 is embedded in the protective cover 140, and the protective cover 140 has a thin thickness; thus, the position of the touch point of the flexible touch panel 130 can still be determined by sensing the capacitance change. When passengers in the absence of touch, the seat armrest 100 is fully functional as a comfortable support. The flexible touch panel 130 is an elastic structure and has a thin thickness; and the elasticity and comfort of the seat armrest 100 is therefore unaffected by the flexible touch panel 130 embedded in the protective cover 140. The flexible touch panel 130 embedded in the protective cover 140 does not affect appearance of the seat armrest 100.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A touch control vehicle seat comprising:
 a seat armrest comprising:
  an armrest frame;
  a flexible pad located on the armrest frame, wherein a material of the flexible pad is selected from the group consisting of sponge, fabric, cotton, and plastic foam;
  a flexible touch panel located on the flexible pad, and the flexible touch panel being an elastic structure and comprising a flexible substrate and a carbon nanotube touch function layer; and
  a protective cover being wrapped about the flexible touch panel;
  wherein the carbon nanotube touch function layer comprises a carbon nanotube film, a plurality of first electrodes, and a plurality of second electrodes; the carbon nanotube film is located on a flexible substrate surface; and the plurality of first electrodes and the plurality of second electrodes are electrically connected to the carbon nanotube film.
2. The touch control vehicle seat of claim 1, wherein the carbon nanotube touch function layer is a single layer structure.

3. The touch control vehicle seat of claim 2, wherein a touch point position on a protective cover surface is detected by the carbon nanotube touch function layer.
4. The touch control vehicle seat of claim 1, the flexible touch panel is located at one end of the flexible pad away from seat back.
5. The touch control vehicle seat of claim 4, wherein the flexible touch panel is located below fingers of a user seating on the touch control vehicle seat and holding the seat armrest.
6. The touch control vehicle seat of claim 1, wherein an upper surface of the flexible pad is a streamline structure of a curved surface.
7. The touch control vehicle seat of claim 6, wherein the flexible touch panel is bonded to the streamline structure of the curved surface.
8. The touch control vehicle seat of claim 1, wherein the protective cover wraps the flexible touch panel and the flexible pad.
9. The touch control vehicle seat of claim 1, wherein a thickness of the flexible substrate is in a range from about 1 micron to about 2 millimeters.
10. The touch control vehicle seat of claim 1, wherein a thickness of the protective cover is in a range from about 1 micron to about 5 millimeters.
11. The touch control vehicle seat of claim 1, wherein a thickness of the carbon nanotube film ranges from about 0.5 nanometers to about 100 micrometers.
12. The touch control vehicle seat of claim 11, wherein a thickness of the protective cover is in a range from about 0.5 micron to about 1 millimeter.
13. The touch control vehicle seat of claim 1, wherein the carbon nanotube film comprises a first surface and a second surface opposite to the first surface; and the first surface is bonded to the flexible substrate and the second surface is bonded to the protective cover.
14. The touch control vehicle seat of claim 13, wherein the flexible touch panel further comprises a flexible protective layer located on the second surface of the carbon nanotube film.
15. The touch control vehicle seat of claim 1, wherein the carbon nanotube film is an electrically anisotropic film; and a first direction is defined as a lowest impedance direction, a second direction is defined as a highest impedance direction, and the first direction is substantially perpendicular to the second direction.
16. The touch control vehicle seat of claim 15, wherein the carbon nanotube film comprises a first side and a second side opposite to the first side, the first side and the second side are parallel to the second direction; and the plurality of first electrodes are located on the first side and the plurality of second electrodes are located on the second side.
17. The touch control vehicle seat of claim 15, wherein the carbon nanotube film comprises a plurality of carbon nanotubes, a large number of the plurality of carbon nanotubes are extended along the first direction and paralleled to a surface of the flexible substrate.
18. The touch control vehicle seat of claim 17, wherein an end of one carbon nanotube is joined to an end of an adjacent carbon nanotube along the first direction by van der Waals force.
19. The touch control vehicle seat of claim 17, wherein a material of the protective cover is selected from the group consisting of animal leather, artificial leather, and fabric.
20. A vehicle-mounted entertainment system comprising:
 a seat armrest comprising:
  an armrest frame;

a flexible pad located on the armrest frame, wherein a material of the flexible pad is selected from the group consisting of sponge, fabric, cotton, and plastic foam;

a flexible touch panel located on the flexible pad, and the flexible touch panel being an elastic structure and comprising a flexible substrate and a carbon nanotube touch function layer; and a protective cover being wrapped about the flexible touch panel; and a display connected to a touch control vehicle seat comprising the seat armrest and transferred data through a wireless connection or a wired connection;

wherein the carbon nanotube touch function layer comprises a carbon nanotube film, a plurality of first electrodes, and a plurality of second electrodes; the carbon nanotube film is located on a flexible substrate surface; and the plurality of first electrodes and the plurality of second electrodes are electrically connected to the carbon nanotube film.

* * * * *